US010845345B2

(12) United States Patent
Yamane (10) Patent No.: US 10,845,345 B2
(45) Date of Patent: Nov. 24, 2020

(54) CHROMATOGRAPH WITH INTEGRATED DISPLAY UNIT

(71) Applicant: SHIMADZU CORPORATION, Kyoto (JP)

(72) Inventor: Masashi Yamane, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 220 days.

(21) Appl. No.: 16/066,528

(22) PCT Filed: Dec. 28, 2015

(86) PCT No.: PCT/JP2015/086570
§ 371 (c)(1),
(2) Date: Jun. 27, 2018

(87) PCT Pub. No.: WO2017/115443
PCT Pub. Date: Jul. 6, 2017

(65) Prior Publication Data
US 2019/0011409 A1    Jan. 10, 2019

(51) Int. Cl.
*G01N 30/86*    (2006.01)
*G06F 3/0488*   (2013.01)
*G06F 3/0484*   (2013.01)

(52) U.S. Cl.
CPC ....... *G01N 30/8651* (2013.01); *G06F 3/0488* (2013.01); *G01N 30/8658* (2013.01); *G06F 3/04845* (2013.01)

(58) Field of Classification Search
CPC ............ G01N 30/8651; G01N 30/8658; G06F 3/0488; G06F 3/04845
See application file for complete search history.

(56) References Cited

U.S. PATENT DOCUMENTS

| 4,900,446 A * | 2/1990 | Anderson ............. B01D 15/18 210/198.2 |
| 2006/0106509 A1* | 5/2006 | Robb ................ G05B 23/0216 701/29.1 |
| 2008/0059079 A1 | 3/2008 | Watabe et al. |

FOREIGN PATENT DOCUMENTS

| CN | 104424025 A | 3/2015 |
| JP | 7-20559 U | 4/1995 |
| JP | 2008-58156 A | 3/2008 |
| JP | 5206504 B2 | 6/2013 |

(Continued)

OTHER PUBLICATIONS

English translation of prior art document JP H0720559 U—authored by Michio Takei in 1995 (Year: 1995).*

(Continued)

*Primary Examiner* — Herbert K Roberts
*Assistant Examiner* — John M Royston
(74) *Attorney, Agent, or Firm* — Oblon, McClelland, Maier & Neustadt, L.L.P.

(57) ABSTRACT

A gas chromatograph is provided with a main body, a detector 4, a display 11, and a display processing unit 132. The display 11 is provided in the main body. Further, a touch panel type display screen is included in the display 11. The display processing unit 132, based on a detection signal from the detector 4, displays a chromatogram in a first graph region in the display screen, and, based on a touch operation performed by an operator with respect to the first graph region, modifies the display in the first graph region.

4 Claims, 10 Drawing Sheets

(56) References Cited

FOREIGN PATENT DOCUMENTS

JP            2014-32093  A       2/2014
JP            2015-59782  A       3/2015

OTHER PUBLICATIONS

Office Action dated Nov. 20, 2018 in Japanese Patent Application No. 2017-558836, 6 pages (with unedited computer generated English translation).
Combined Chinese Office Action and Search Report dated Nov. 25, 2019 in corresponding Chinese Patent Application No. 201580085551.5 (with English Translation), 10 pages.
International Search Report dated Mar. 22, 2016, in PCT/JP2015/086570 filed Dec. 28, 2015.

* cited by examiner

CHROMATOGRAPH WITH INTEGRATED DISPLAY UNIT

TECHNICAL FIELD

The present invention relates to a chromatograph that displays in a display screen a chromatogram obtained based on a detection signal from a detector.

TECHNICAL BACKGROUND

Usually, a data processing apparatus formed of a personal computer is connected to a chromatograph. A detection signal from a detector provided in the chromatograph is input to the data processing apparatus, and, based on the detection signal, the data processing apparatus performs calculation, and thereby, a chromatogram is obtained (for example, see the following Patent Document 1).

The chromatogram thus obtained is displayed in a display which is provided separately from the chromatograph. The display has a relatively large display screen so that an operator can easily confirm the data.

RELATED ART

Patent Document

[Patent Document 1] Japanese Patent No. 5206504.

SUMMARY OF THE INVENTION

Problems to be Solved by the Invention

In the conventional chromatograph as described above, unless the data processing apparatus is activated, the operator cannot confirm the data. Therefore, it is necessary for the data processing apparatus to be always in an activated state during an analysis, and, when the analysis time is long, there is a problem that power consumption increases. Further, for an operator performing an operation with respect to a chromatograph, it may be more convenient to be able to confirm data in a main body of the chromatograph.

Therefore, it has been considered to provide a data processing unit for data processing, and a display in a main body of a chromatograph. However, it is difficult to secure a space enough for providing a display with a large display screen in a main body of a chromatograph. Therefore, in a main body of a chromatograph, it was difficult to confirm details of a chromatogram or to confirm while comparing analysis results of multiple times.

The present invention is accomplished in view of the above-described situation, and provides a chromatograph that allows a detailed confirmation operation of a chromatogram displayed based on a detection signal from a detector to be easily performed in a main body.

Means for Solving the Problems (1) A chromatograph according to the present invention includes a main body, a detector, a display, and a display processing unit. The detector is provided in the main body and detects a sample and outputs a detection signal. The display is provided in the main body and has a touch panel type display screen. The display processing unit, based on a detection signal from the detector, displays a chromatogram in a graph region in the display screen, and, based on a touch operation with respect to the graph region in the display screen, modifies the display in the graph region.

According to such a structure, an operator, by only performing a touch operation with respect to the touch panel type display screen provided in the main body, can confirm the graph region after modification in the display screen while modifying the display in the graph region in the display screen.

Therefore, a detailed confirmation operation of the chromatogram displayed in the graph region can be easily performed in the main body.

(2) Further, the display processing unit, based on a touch operation with respect to the graph region in the display screen, may display in an enlarged scale or in a reduced scale the chromatogram displayed in the graph region.

According to such a structure, by displaying in an enlarged scale a noteworthy portion of the chromatogram displayed in the graph region, details of the portion can be easily confirmed in the main body. Further, by displaying in a reduced scale the chromatogram displayed in the graph region, the entire chromatogram can be easily confirmed in the main body.

(3) The display processing unit, based on a touch operation with respect to the graph region in the display screen, may superimposingly display the chromatogram displayed in the graph region and another chromatogram.

According to such a structure, comparison of the chromatogram displayed in the graph region with another chromatogram can be easily performed in the main body.

(4) The display processing unit, based on a detection signal from the detector, may display a chromatogram in the graph region in the display screen while allowing the chromatogram to change in real time, and, based on a touch operation with respect to the graph region in the display screen, stops the changing of the chromatogram, and, based on a touch operation with respect to the graph region thereafter, modifies the display in the graph region.

According to such a structure, a changing chromatogram can be displayed in real time in the graph region, and, by performing a touch operation with respect to the graph region, the changing of the chromatogram can be stopped and the display in the graph region can be modified.

Therefore, while the chromatogram can be displayed in real time, when a detailed confirmation operation of the chromatogram is performed, the confirmation can be easily performed by stopping the changing of the chromatogram.

(5) The display processing unit, after stopping the display of the chromatogram in the graph region in the display screen, when a touch operation with respect to the graph region has not been performed for a certain period of time, may resume the changing of the chromatogram.

According to such a structure, that a stopped chromatogram is displayed for a long time in the graph region can be suppressed. Further, since it is unnecessary to perform an operation for resuming the changing of the chromatogram, a confirmation operation is further facilitated.

Effect of Invention

According to the present invention, the display in the graph region can be modified by only a touch operation with respect to the display screen. Further, the graph region after modification can be confirmed in the display screen. Therefore, a detailed confirmation operation of the chromatogram displayed based on a detection signal from the detector can be easily performed in the main body.

MODE FOR CARRYING OUT THE INVENTION

1. Overall Structure of Gas Chromatograph

Figure 1:
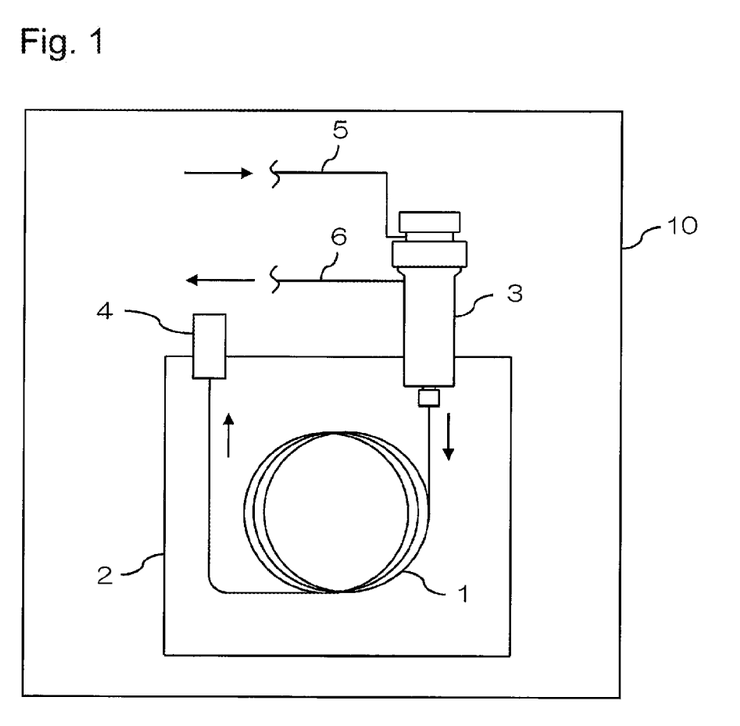
FIG. 1 is a schematic diagram illustrating a structural example of a gas chromatograph according to an embodiment of the present invention.

FIG. 1 is a schematic diagram illustrating a structural example of a gas chromatograph according to an embodiment of the present invention. The gas chromatograph is for performing analysis by supplying a sample gas together with a carrier gas into a column 1, and includes, in addition to the column 1, a column oven 2, a sample introduction unit 3, a detector 4, and a hollow main body 10 accommodating these components, and the like.

The column 1 is formed, for example, from a capillary column. The column 1 is accommodated together with a heater and a fan (both are not illustrated in the drawings) in the column oven 2.

The column oven 2 is for heating the column 1, and drives the heater and the fan as appropriate at the time of analysis.

The sample introduction unit 3 is for introducing a carrier gas and a sample gas into the column 1, and a sample vaporization chamber (not illustrated in the drawings) is formed therein. A liquid sample is injected into the sample vaporization chamber, and the sample vaporized in the sample vaporization chamber is introduced together with a carrier gas into the column 1. Further, a gas supply flow path 5 and a split flow path 6 are communicatively connected to the sample vaporization chamber.

The gas supply flow path 5 is a flow path for supplying a carrier gas into the sample vaporization chamber of the sample introduction unit 3.

When a carrier gas and a sample gas are introduced into the column 1 using a split introduction method, the split flow path 6 is a flow path for discharging a part of a gas (a mixed gas of the carrier gas and the sample gas) in the sample vaporization chamber to the outside at a predetermined split ratio.

The detector 4 is formed of various detectors such as a hydrogen flame ionization detector (FID). The detector 4 sequentially detects sample components contained in a carrier gas introduced from the column 1.

In the gas chromatograph, when a sample is measured, the sample to be measured is injected into the sample introduction unit 3. Then, the sample is vaporized in the sample vaporization chamber. Further, a carrier gas is supplied via the gas supply flow path 5 to the sample vaporization chamber of the sample introduction unit 3.

The sample vaporized in the sample vaporization chamber is introduced together with the carrier gas is introduced into the column 1. The sample components contained in the sample are separated in a process of passing through the column 1, and are sequentially introduced into the detector 4.

Then, in the detector 4, the sample components contained in the carrier gas introduced from the column 1 are sequentially detected. Further, based on a detection result of the detector 4, a chromatogram is generated.

2. Specific Structures of Controller and Peripheral Members

Figure 2:
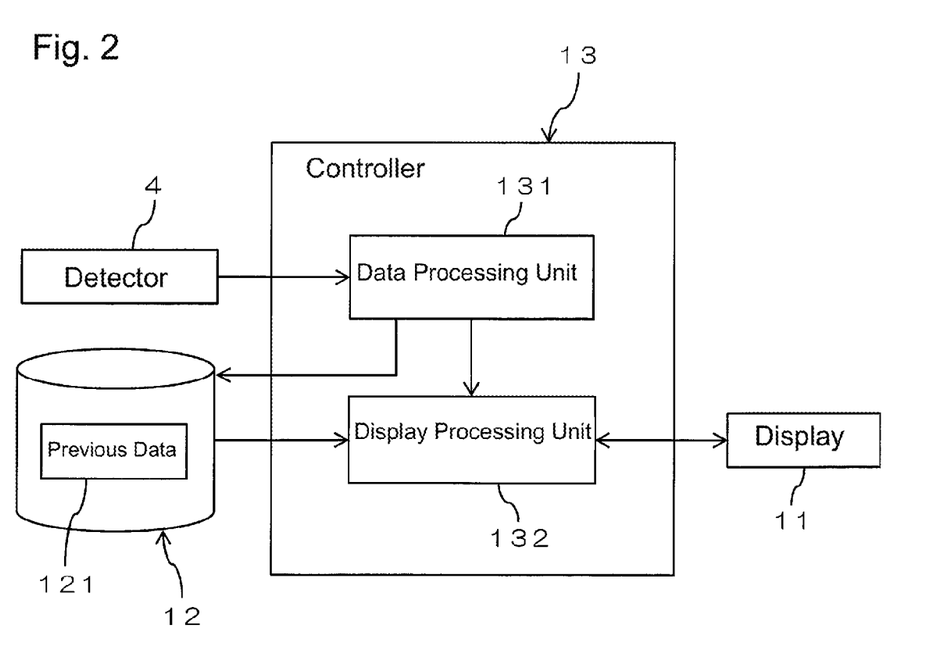
FIG. 2 is a block diagram illustrating specific structures of a controller of the gas chromatograph of FIG. 1 and peripheral members of the controller.

FIG. 2 is a block diagram illustrating specific structures of a controller of the gas chromatograph of FIG. 1 and peripheral members of the controller.

The gas chromatograph includes, in addition to the above-described detector 4, a display 11, a memory 12, and a controller 13.

The display 11 is provided in the main body 1 (see FIG. 1). As will be described in detail later, the display 11 includes a touch panel. That is, in the gas chromatograph, using the display 11, an operator can perform confirmation of information and an input operation while performing analysis.

The memory 12 is formed of, for example, a ROM (Read Only Memory) and a RAM (Random Access Memory) and the like. The memory 12 stores previous data 121. The previous data 121 is data of a chromatogram generated by a data processing unit 131 to be described later, and is data generated during a previous analysis.

The controller 13 includes, for example, a CPU (Central Processing Unit). The controller 13 can input or output an electric signal from or to the detector 4 and the display 11. The controller 13 inputs or outputs data to or from the memory 12 as necessary. The controller 13 functions as a data processing unit 131 and a display processing unit 132 by causing the CPU to execute a program.

The data processing unit 131 obtains a chromatogram based on a detection signal from the detector 4. Further, when an analysis is completed in the gas chromatograph, data of a chromatogram generated by the data processing unit 131 is stored in the memory 12 as the previous data 121 by rewriting the existing data.

The display processing unit 132, based on the data of the chromatogram generated by the data processing unit 131, performs processing to display the chromatogram in the display 11. Further, the display processing unit 13, based on an input signal from the display 11 due to an operation on the touch panel and the previous data 121 in the memory 12, performs processing to modify a chromatogram to be displayed in the display 11.

3. Screen Structure of Display Screen

Figure 3:
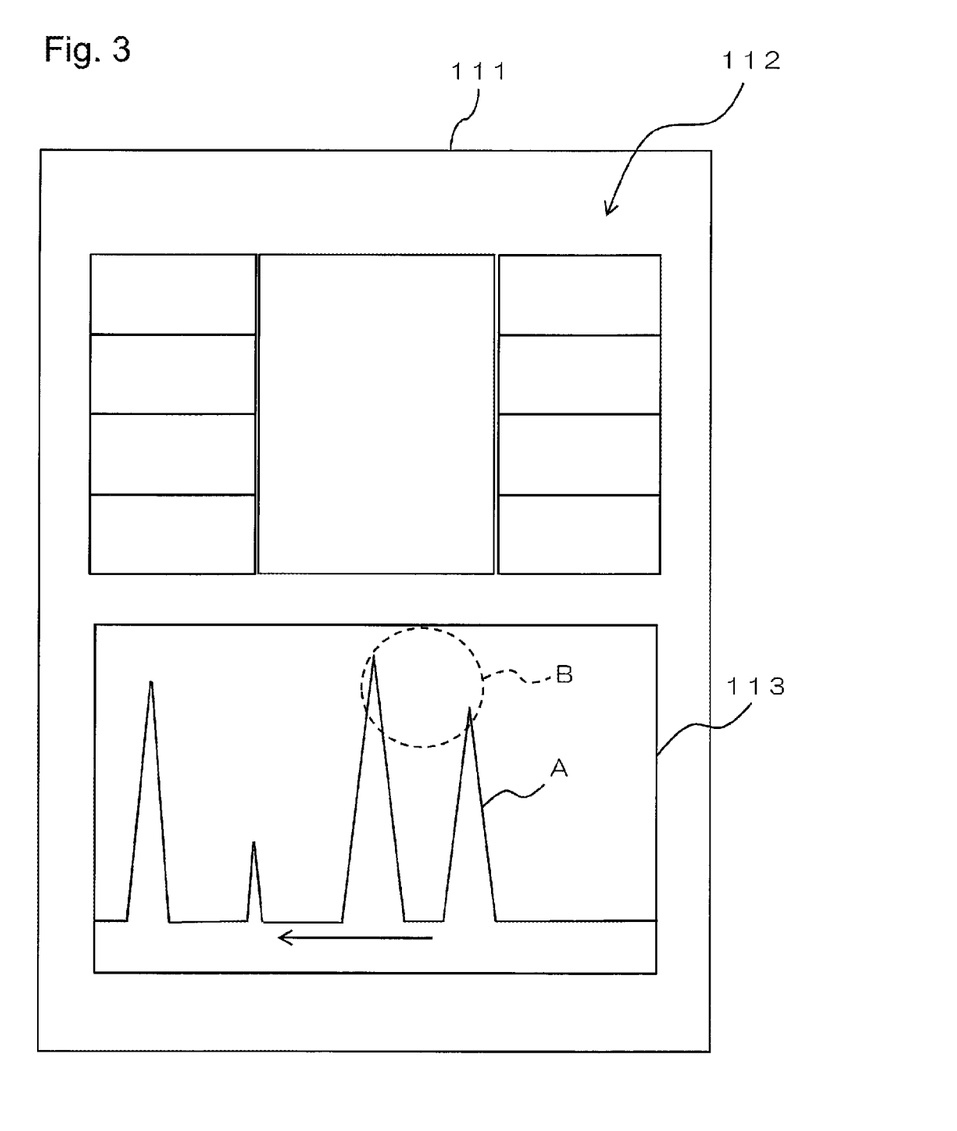
FIG. 3 is a schematic diagram illustrating an example of a display mode of a display screen in a state of a basic screen.

FIG. 3 is a schematic diagram illustrating an example of a display mode of a display screen 111 in a state of a basic screen.

The display screen 111 of a touch panel type is included in the above-described display 11. The display 11 is provided in the main body 10 (see FIG. 1), and an operator can confirm the display screen 111 on the main body 10. Specifically, the display 11 is provided on a front surface of the main body 10 so that an operator can easily operate. Further, usually, an openable and closeable door is provided on the front surface of the main body 10. That is, the display 11 is arranged in a relatively small space on the front surface of the main body 10 such that a space for arranging a door or the like is secured.

The display screen 111 is formed in a substantially rectangular shape. The display screen 111 includes an operation display region 112 and a first graph region 113.

The operation display region 112 is arranged on an upper side in the display screen 111. The operation display region 112 is a region for displaying operation conditions of various parts of the gas chromatograph. For example, in the operation display region 112, operation conditions such as a temperature of the column 1, a temperature and a pressure in the sample introduction unit 3, a flow rate of a carrier gas supplied into the sample introduction unit 3, a temperature of the detector 4, and the like are displayed.

The first graph region 113 is arranged on a lower side in the display screen 111. The first graph region 113 is a region for displaying a result of data processing by the data processing unit 131 as a graph, and, specifically, a region for displaying in real time a chromatogram generated by the data processing unit 131. A chromatogram is displayed in which a horizontal axis represents time and a vertical axis represents signal strength.

Such a screen structure of the display screen 111 is a basic screen of the display screen 111. Then, the display processing unit 132, as will be described later, based on a touch operation on the display screen 111 by an operator, modifies display content of the display screen 111.

4. Control Operation of Controller and Display Mode of Display Screen

Figure 4:
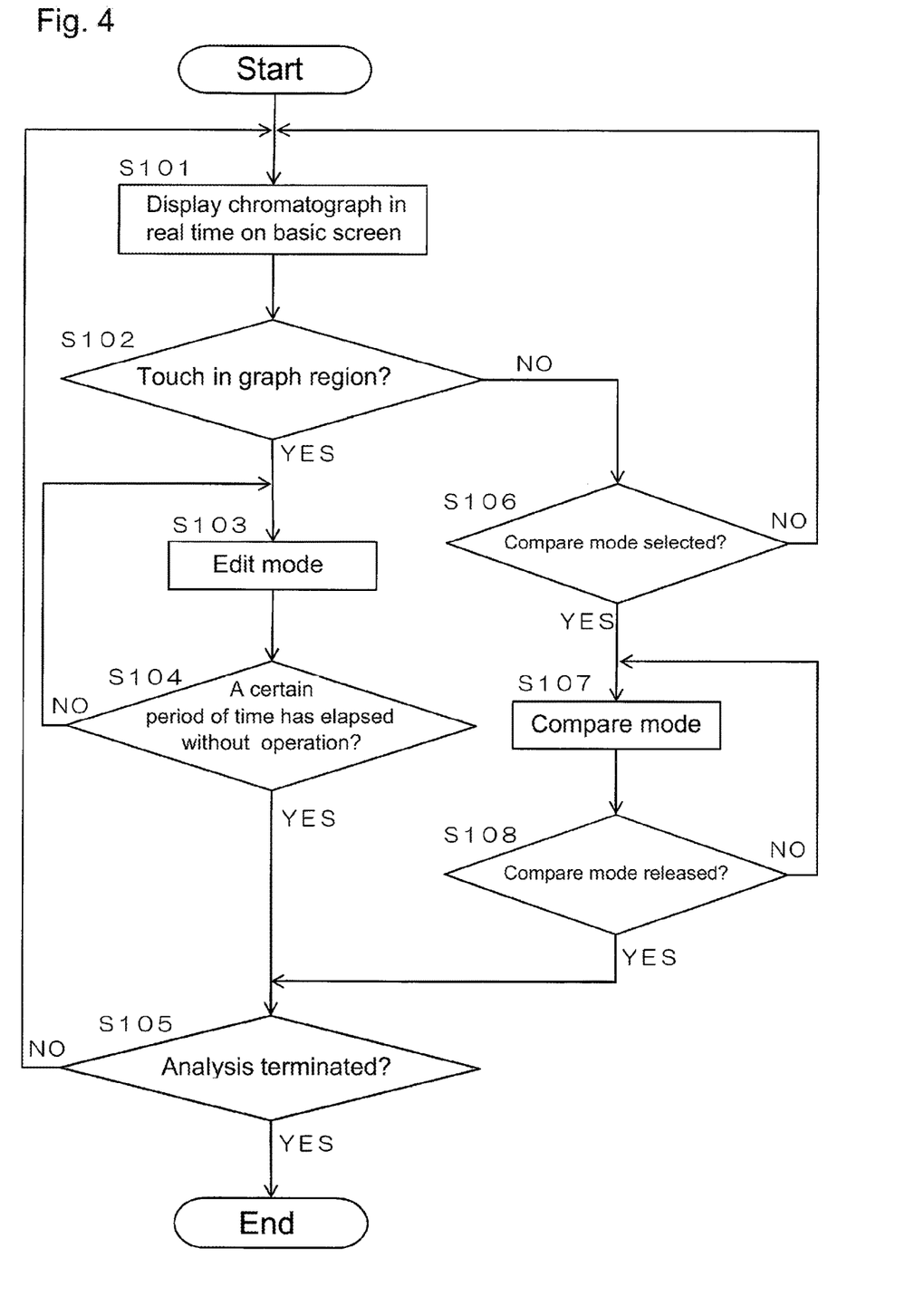
FIG. 4 is a flowchart illustrating an example of a process performed by the controller.

FIG. 4 is a flowchart illustrating an example of a process performed by the controller 13.

Usually, in the display screen 111 of the display 11, as illustrated in FIG. 3, the above basic screen is displayed. Then, when a chromatogram is generated by the data processing unit 131 based on a detection signal from the detector 4, the display processing unit 132 displays in real time the chromatogram in the first graph region 113 (step S101).

Specifically, in a state in which the basic screen is displayed in the display screen 111, in the first graph region 113, a graph A which is a chromatogram generated by the data processing unit 131 is displayed so as to move from the right to the left. In the graph A, content displayed on the right end side corresponds to a chromatogram generated in real time. Then, the content displayed on the right end side of the graph A moves toward the left side as time elapses, and, as time further elapses, disappears from the first graph region 113.

In this way, while the basic screen is displayed in the display screen 111 of the display 11, the chromatogram generated by the data processing unit 131 is displayed in real time as the graph A in the first graph region 113. Then, an operator performs various analyses by confirming the graph A.

Further, from this state, when a touch operation is performed with respect to the first graph region 113 (YES at step S102), the display processing unit 132 first stops the movement of the graph A in the first graph region 113 and sets the display screen 111 to an edit mode (step S103). In the state in which the display screen 111 is in the edit mode, the display processing unit 132, as will be described later, based on a touch operation with respect to the first graph region 113, modifies the display content of the first graph region 113.

Further, after the display screen 111 is in the edit mode, when a certain period of time has elapsed during which a touch operation with respect to the first graph region 113 is not performed (YES at step S104) and when the analysis has not been completed (NO at step S105), the display processing unit 132 resumes the real time display of the chromatogram in the first graph region 113 and thereby returns the display screen 111 to the basic screen. Then, when the analysis in the gas chromatograph has been completed (YES at step S105), the display processing unit 132 terminates the control operation with respect to the display screen 111.

On the other hand, from a state in which the basic screen is displayed in the display screen 111, when a touch operation with respect to the data processing unit 131 is not performed (NO at step S102) and a predetermined touch operation for selecting a compare mode is performed on the display screen 111 (YES at step S106), the display processing unit 132 sets the display screen 111 to the compare mode (step S107). In the state in which the display screen 111 is in the compare mode, as will be described later, two regions displaying chromatograms are displayed (a two-screen display is displayed).

Then, from a state in which the display screen 111 is in the compare mode, when a predetermined touch operation for canceling the compare mode in the display screen 111 is performed (YES at step S108) and the analysis has not been completed (NO at step S105), the display processing unit 132 returns the chromatogram to a one-screen display, and resumes the real time display of the chromatogram in the first graph region 113, and thereby, returns the display screen 111 to the basic screen. Further, when the analysis in the gas chromatograph has been completed (YES at step S105), the display processing unit 132 terminates the control operation with respect to the display screen 111.

A predetermined touch operation in the display screen 111 is, for example, an operation of touching a button (not illustrated in the drawings) displayed in the display screen 111, or the like.

Figure 5:
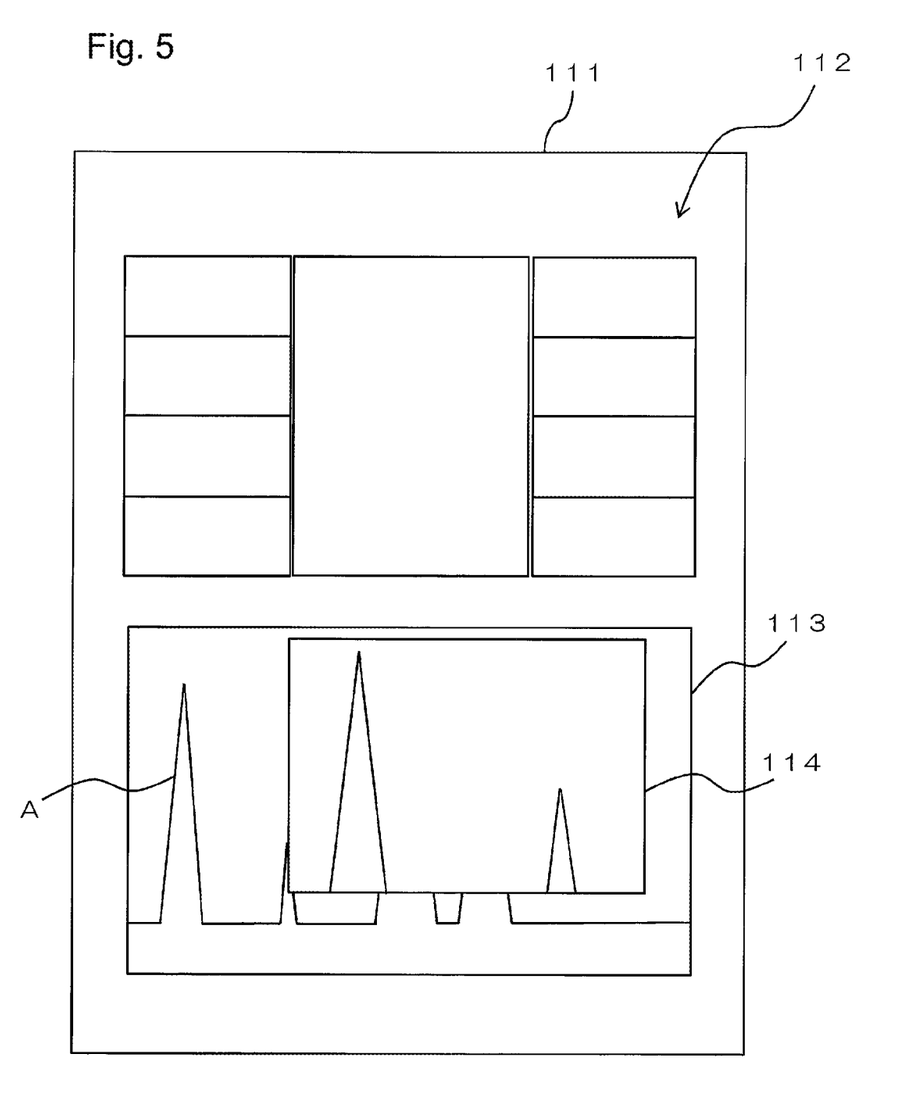
FIG. 5 is a schematic diagram illustrating an example in which an enlarged screen is displayed, which is an example of a display mode of the display screen in a state of an edit mode.

FIG. 5 is a schematic diagram illustrating an example in which an enlarged screen 114 is displayed, which is an example of a display mode of the display screen 111 in the state of the edit mode. Further, FIG. 6 is a schematic diagram illustrating an example in which a chromatogram is displayed in a reduced scale, which is an example of a display mode of the display screen 111.

Figure 6:
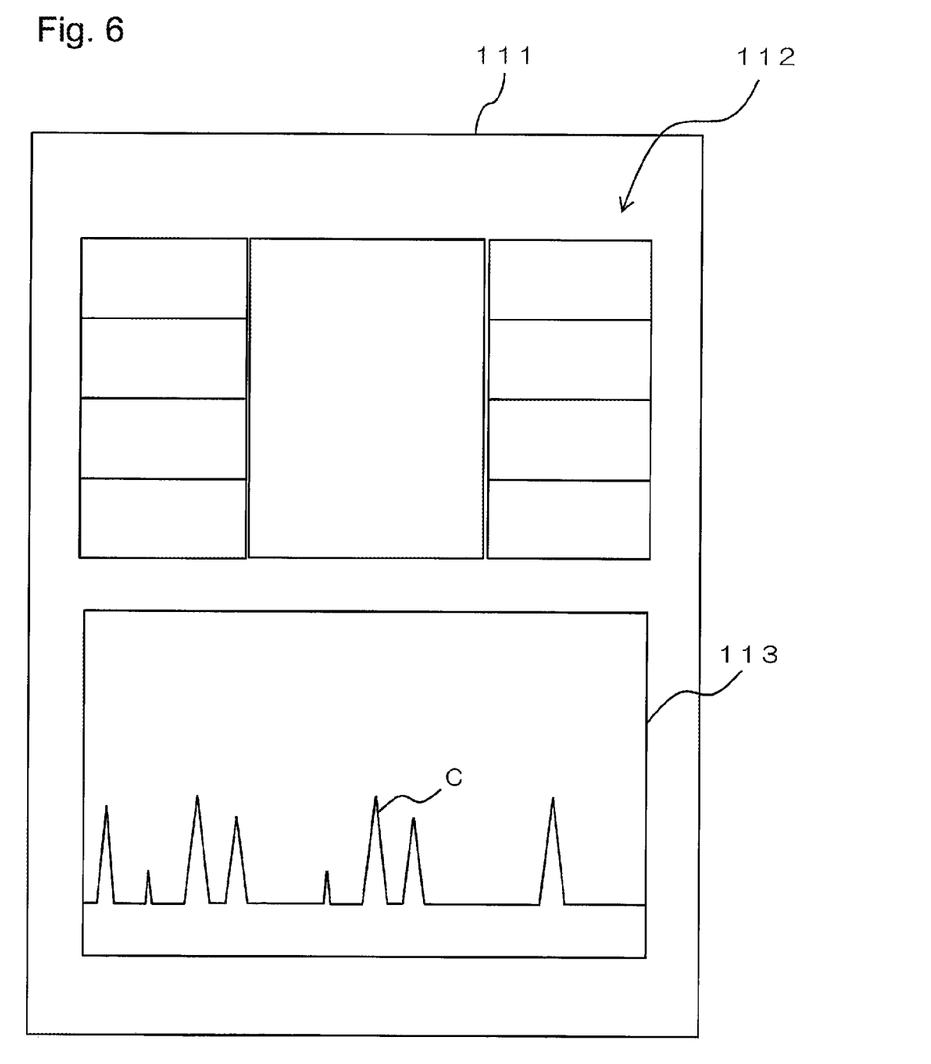
FIG. 6 is a schematic diagram illustrating an example in which a chromatogram is displayed in a reduced scale, which is an example of a display mode of the display screen in the state of the edit mode.

With reference to FIGS. 3, 5 and 6, the display mode of the display screen 111 in the state of the edit mode is described.

For example, as illustrated in FIG. 3, in the state in which the basic screen is displayed in the display screen 111, depending on the display content of the graph A, there may be a case where a highly accurate analysis cannot be performed unless the details of the display content is further confirmed. In order to address such a case, the display processing unit 132, based on a touch operation with respect to the first graph region 113, sets the display screen 111 to the edit mode and modifies the display content of the first graph region 113 as follows.

Specifically, in the state in which the display screen 111 is set to the edit mode, when a touch by an operator with respect to a predetermined portion of the first graph region 113 is continued for a certain period of time (when a long press with respect to the first graph region 113 is performed), as illustrated in FIG. 5, the display processing unit 132 displays the enlarged screen 114 in the display screen 111.

The enlarged screen 114 is superimposingly displayed in the first graph region 113. In the enlarged screen 114, a certain region of the first graph region 113 centered on the portion that is continuously touched for a certain period of time is displayed in an enlarged scale.

In FIG. 5, by continuously touching a region B illustrated in FIG. 3, the display screen 111 in the case of the edit mode is displayed. That is, in FIG. 5, the region B illustrated in FIG. 3 is displayed in an enlarged scale in the enlarged screen 114.

Further, from this state, when a touch operation is performed with respect to the enlarged screen 114, the display processing unit 132, based on the touch operation, modifies the display content in the enlarged screen 114.

For example, from a state in which a portion of the enlarged screen 114 is touched by an operator, when a sliding operation is performed so as to shift the touch portion, the display processing unit 132 moves the display in the enlarged screen 114 in the sliding direction. Further, from a state in which any two places in the enlarged screen 114 are touched by an operator, when a sliding operation (pinch out) is performed so as to expand the touch portion, the display processing unit 132 further enlarges the display in the enlarged screen 114. Further, from the state in which any two places in the enlarged screen 114 are touched by the operator, when a sliding operation (pinch out) is performed so as to narrow the touch portion, the display processing unit 132 reduces the display in the enlarged screen 114.

Further, for example, as illustrated in FIG. 3, in the state in which the basic screen is displayed in the display screen 111, there may be a case where it is desirable to confirm the entire chromatogram. In order to address such a case, the display processing unit 132, based on a touch operation with respect to the first graph region 113, sets the display screen 111 to the edit mode and modifies the display content of the first graph region 113 as follows.

Specifically, in the state in which the display screen 111 is set to the edit mode, from a state in which any two places in the first graph region 113 are touched by an operator, when a sliding operation (pinch in) is performed so as to narrow the touch portion, as illustrated in FIG. 6, the display processing unit 132 displays a reduced graph C in the first graph region 113. The graph C shows the entire chromatogram generated by the data processing unit 131 during a period until the display screen 111 is in the edit mode.

Further, although not illustrated in the drawings, in the state in which the display screen 111 is set to the edit mode, from a state in which any two places in the first graph region 113 are touched by an operator, when a sliding operation (pinch out) is performed so as to extend the touch portion, the display processing unit 132 displays a graph further enlarged from the graph A illustrated in FIG. 3 in the first graph region 113.

Then, when a predetermined period of time has elapsed during which a touch operation with respect to such a first graph region 113 is not performed, the display processing unit 132 terminates the edit mode of the display screen 111. Then, when the analysis has not been completed, as illustrated in FIG. 3, by resuming the real time display of the chromatogram in the first graph region 113, the display screen 111 is returned to the basic screen.

Figure 7:
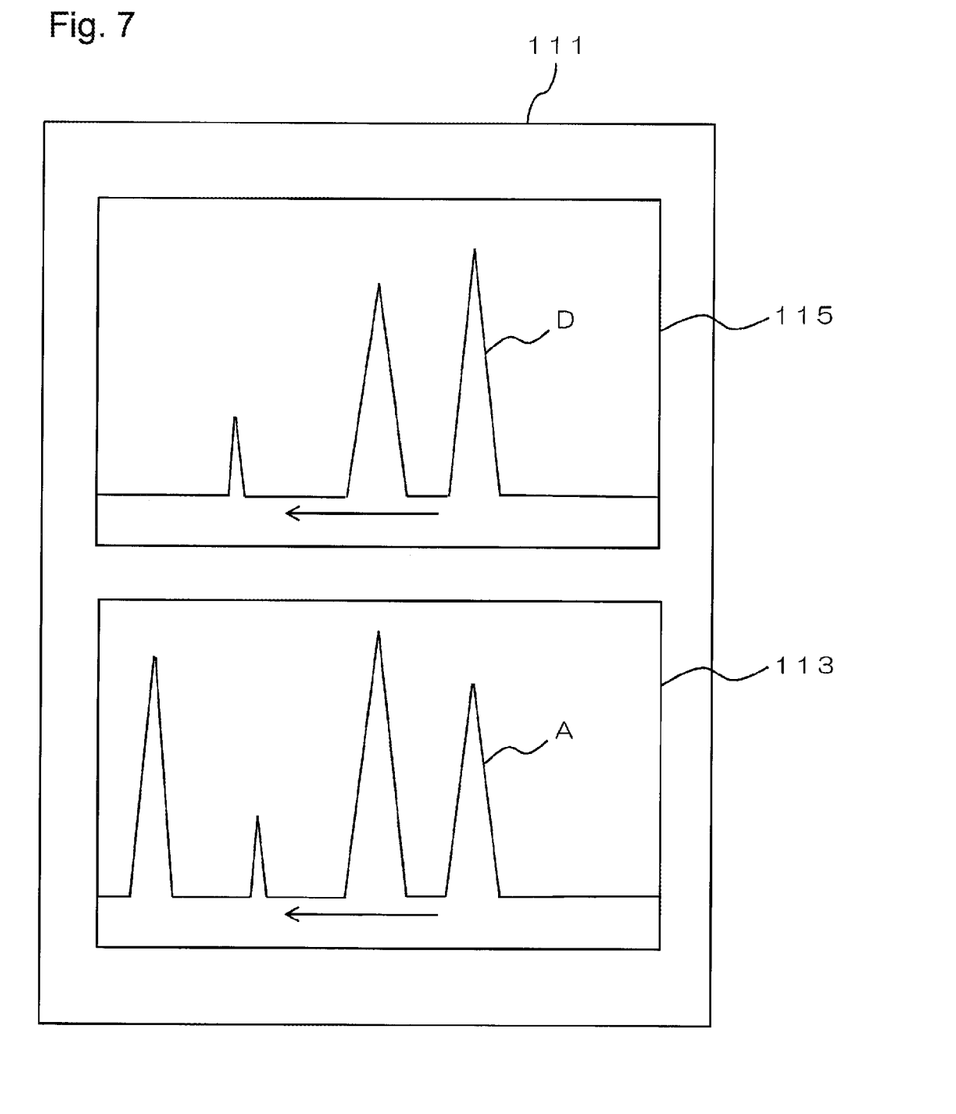
FIG. 7 is a schematic diagram illustrating a state immediately after the display screen is in a compare mode, which is an example of the display mode of the display screen in a state of the compare mode.
Figure 8:
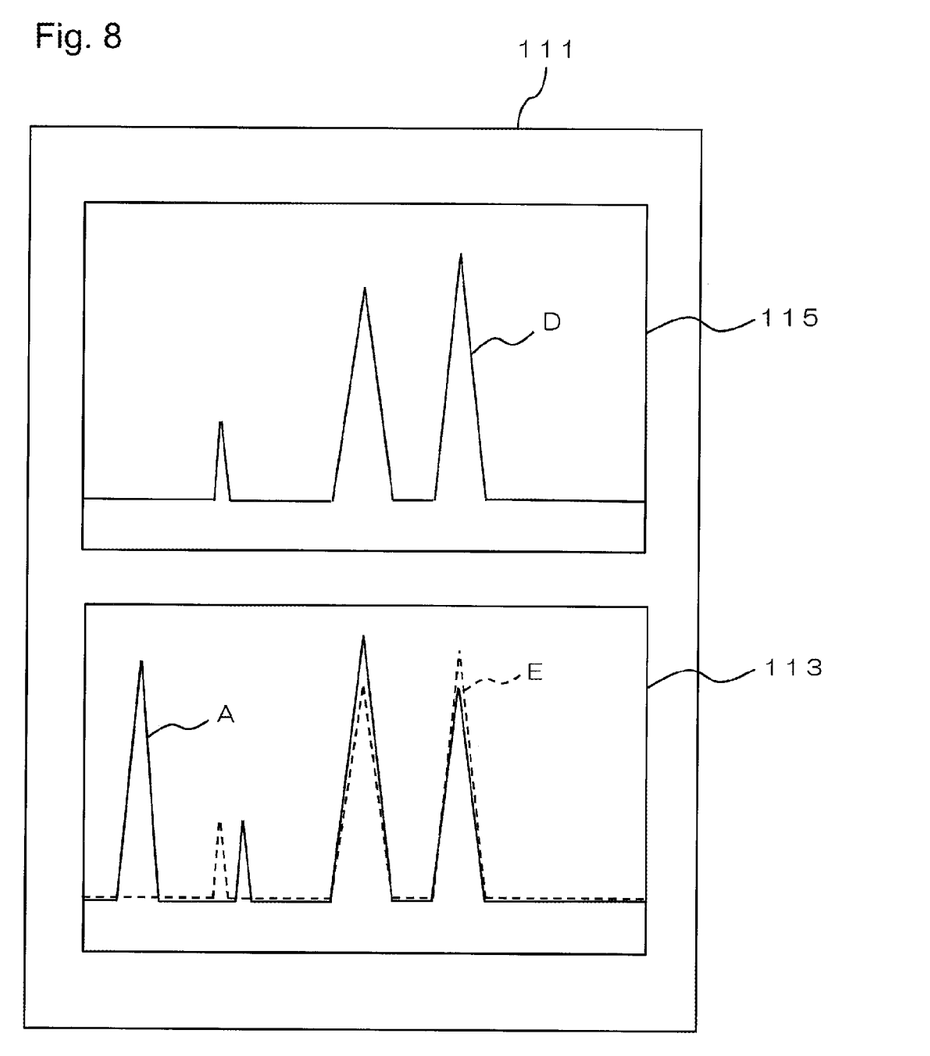
FIG. 8 is a schematic diagram illustrating a state in which, in the first graph region, a chromatogram of a previous analysis is superimposingly displayed with respect to a chromatogram under analysis, which is an example of a display mode of the display screen in the state of the compare mode.
Figure 9:
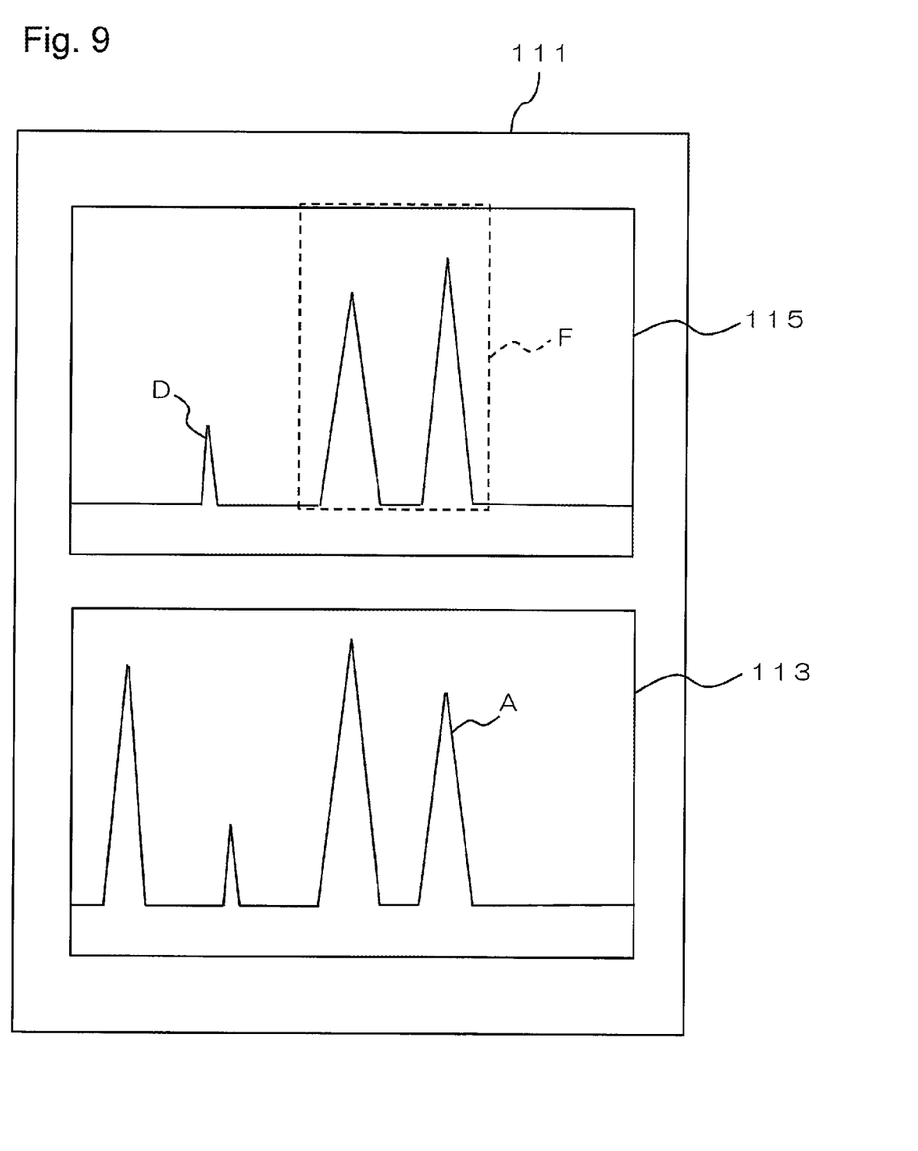
FIG. 9 is a schematic diagram illustrating a state in which a portion of a chromatogram in a second graph region is selected, which is an example of a display mode of the display screen in the state of the compare mode.
Figure 10:
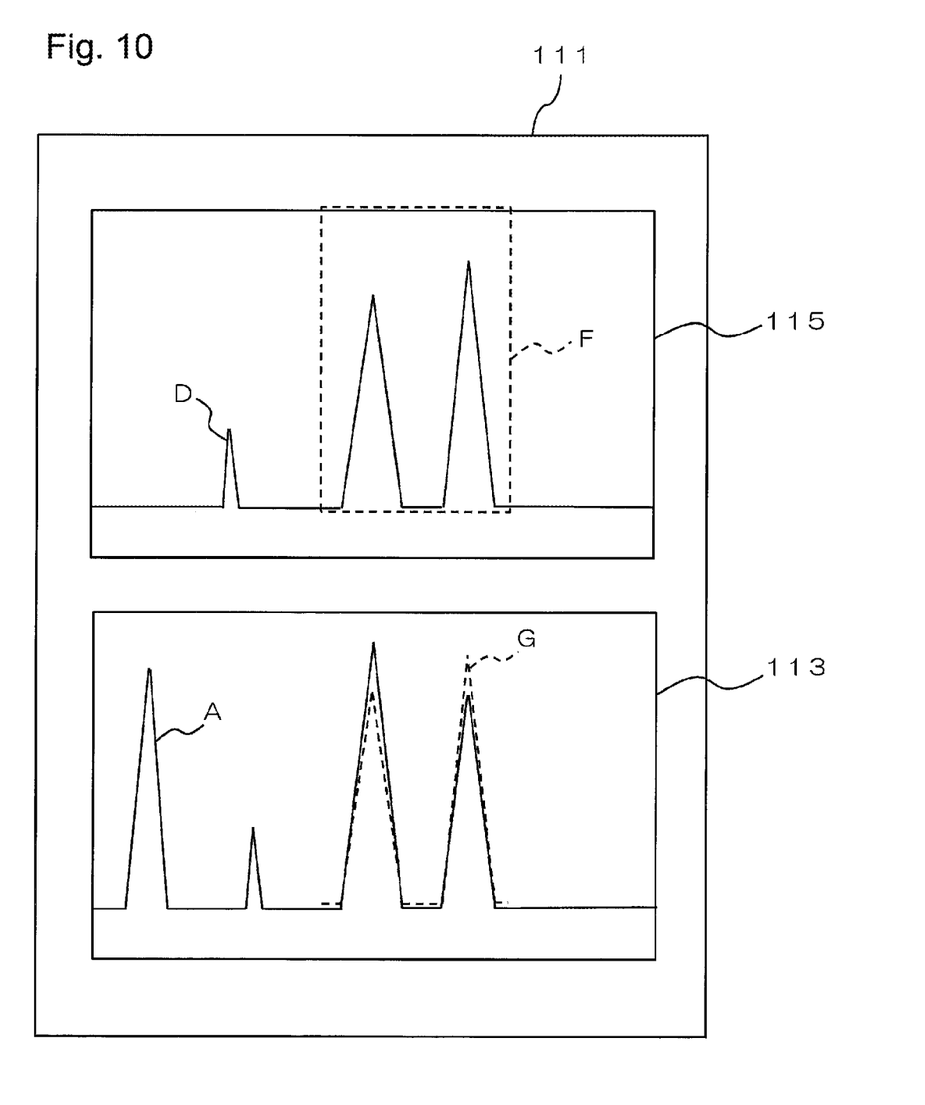
FIG. 10 is a schematic diagram illustrating a state in which, in the first graph region, a portion of a chromatogram of a previous analysis is superimposingly displayed with respect to a chromatogram under analysis, which is an example of a display mode of the display screen in the state of the compare mode.

FIGS. 7-10 are schematic diagrams illustrating examples of display modes of the display screen 111 in the state of the compare mode. Specifically, FIG. 7 illustrates a state immediately after the display screen 111 is in the compare mode. Further, FIG. 8 illustrates a state in which, in the first graph region 113, a chromatogram of a previous analysis is superimposingly displayed with respect to a chromatogram under analysis. Further, FIG. 9 illustrates a state in which, in a second graph region 115, a portion of a chromatogram is selected. Further, FIG. 10 illustrates a state in which, in the first graph region 113, a portion of a chromatogram of a previous analysis is superimposingly displayed with respect to a chromatogram under analysis.

With reference to FIGS. 7-10, the display mode of the display screen 111 in the state of the compare mode is described.

For example, in the state in which the basic screen is displayed in the display screen 111, depending on the display content of the graph A, there may be a case where a highly accurate analysis can be performed by comparing with data of a previous analysis. In order to address such a case, the display processing unit 132, based on a touch operation with respect to the display screen 111, sets the display screen 111 to the compare mode and modifies the display content of the display screen 111 as follows.

As illustrated in FIG. 7, in the display screen 111 in the compare mode, the above-described first graph region 113 is displayed on the lower side and the second graph region 115 is displayed on the upper side.

In the first graph region 113, as described above, the graph A which is a chromatogram generated by the data processing unit 131 is displayed so as to move from the right to the left. That is, in the first graph region 113, the chromatogram is displayed in real time.

The second graph region 115 is a region for displaying a chromatogram generated during a previous analysis, and a graph D corresponding to the previous data 121 stored in the memory 12 is displayed. Further, in the second graph region 115, the graph D is displayed so as to move from the right to the left so as to correspond to the graph A displayed in the first graph region 113. That is, immediately after the display screen 111 is in the compare mode, in the display screen 111, two regions are displayed each showing a chromatogram, and the chromatogram in each region is displayed so as to move.

An operator, by confirming the display screen 111 in this state, compares the chromatogram generated in real time by the data processing unit 131 with the chromatogram generated during the previous analysis.

Then, from this state, when a touch operation is farther performed with respect to the display screen 111, based on the touch operation, the display processing unit 132 modifies the display content.

Specifically, in the state in which the display screen 111 is set to the compare mode, when a touch operation with respect to the first graph region 113 or the second graph region 115 by an operator, the display processing unit 132 first stops the movement of the graph A in the first graph region 113 and the movement of the graph D in the second graph region 115.

Then, from a state in which a portion of the second graph region 115 is touched by an operator, when a sliding operation (drag) is performed so as to shift the touch portion downward, as illustrated in FIG. 8, the display processing unit 132 superimposes a graph F on the graph A in the first graph region 113. The graph E is a graph obtained by copying the graph D displayed in the second graph region 115.

That is, in the first graph region 113, the graph A which is a chromatogram under analysis and the graph E which is a chromatogram of a previous analysis are superimposingly displayed in a state in which their horizontal axes (time axes) are associated with each other.

In this case, it is preferable that the graph A and the graph E are distinguished from each other by, for example, displaying them in different colors.

Then, from the first graph region 113 in this state, an operator evaluates reproducibility by confirming a correspondence relationship between a peak in the chromatogram under analysis and a peak in the chromatogram of the previous analysis.

Further, from the state in which the display screen 111 is in the compare mode, when predetermined two places in the second graph region 115 are touched by an operator, as illustrated in FIG. 9, the display processing unit 132 selects a region F for which a time range is set by the two touched places. Further, as illustrated in FIG. 10, the display processing unit 132 superimposes a graph G on the graph A in the first graph region 113. The graph G is a graph obtained by selecting and copying the portion of the graph D displayed in the region F in the second graph region 115.

That is, in the first graph region 113, the graph A which is a chromatogram under analysis and the graph G which is a portion of a chromatogram of a previous analysis are superimposingly displayed in a state in which their horizontal axes (time axes) are associated with each other.

In this case, it is preferable that the graph A and the graph G are distinguished from each other by, for example, displaying them in different colors.

Then, from the first graph region 113 in this state, an operator evaluates reproducibility by confirming a correspondence relationship between a peak in the chromatogram under analysis and a peak in the chromatogram of the previous analysis.

Further, when the analysis in the gas chromatograph is completed, as illustrated in FIG. 2, the data processing unit 131 stores the generated chromatogram as new previous data 121 in the memory 12 by rewriting the existing previous data 121.

5. Operation Effect (1) In the present embodiment, in the gas chromatograph, the display 11 is provided in the main body 10. Further, the touch panel type display screen 111 is included in the display 11. Then, the display processing unit 132, based on a detection signal from the detector 4, displays a chromatogram in the first graph region 113 in the display screen 111, and, based on a touch operation with respect to the first graph region 113, modifies the display in the first graph region 113.

Therefore, an operator, by only performing a touch operation with respect to the touch panel type display screen 111 provided in the main body 10, can confirm the first graph region 113 after modification in the display screen while modifying the display in the first graph region 113 in the display screen 111.

Therefore, a detailed confirmation operation of the chromatogram displayed in the first graph region 113 can be easily performed in the main body 10.

(2) Further, in the present embodiment, as illustrated in FIG. 5, the display processing unit 132, based on a touch operation with respect to the first graph region 113 in the display screen 111, displays the enlarged screen 114. Similarly, as illustrated in FIG. 6, the display processing unit 132, based on a touch operation with respect to the first graph region 113 in the display screen 111, displays in a reduced scale the chromatogram displayed in the first graph region 113.

Therefore, by displaying in an enlarged scale a noteworthy portion of the chromatogram displayed in the first graph region 113, details of the portion can be easily confirmed in the main body 10. Further, by displaying in a reduced scale the chromatogram displayed in the first graph region 113, the entire chromatogram can be easily confirmed in the main body 10.

(3) Further, in the present embodiment, as illustrated in FIGS. 8 and 10, the display processing unit 132, based on a touch operation with respect to the second graph region 115 in the display screen 111, superimposingly displays a chromatogram of a previous analysis with respect to the chromatogram displayed in the first graph region 113.

Therefore, comparison of the chromatogram displayed in the first graph region 113 with a chromatogram of previous analysis can be easily performed in the main body 10.

(4) Further, in the present embodiment, as illustrated in FIG. 4, from the state in which the display screen 111 is the basic screen, based on that a touch operation has been performed with respect to the first graph region 113 in the display screen 111 (YES at step S102), the display processing unit 132 stops the changing of the chromatogram and sets the display screen 111 to the edit mode (step S103). Then, from the state in which the display screen 111 is in the edit mode, based on that a touch operation has been performed with respect to the first graph region 113 in the display screen 111, the display in the first graph region 113 is modified.

Therefore, while the chromatogram can be displayed in real time by setting the display screen 111 to the basic screen, when a detailed confirmation operation of the chromatogram is performed, by setting the display screen 111 to the edit mode, the confirmation can be easily performed by stopping the changing of the chromatogram.

(5) Further, in the present embodiment, as illustrated in FIG. 4, in the state in which the display screen 111 is in the edit mode, when a certain period of time has elapsed in a state in which a touch operation with respect to the first graph region 113 is not performed (YES at step S104) and when the analysis has not been completed (NO at step S105), the display processing unit 132 resumes the real time display of the chromatogram in the first graph region 113 (step S101) and thereby returns the display screen 111 to the basic screen.

Therefore, that a stopped chromatogram is displayed for a long time in the graph region can be suppressed. Further, since it is unnecessary to perform an operation for resuming the changing of the chromatogram, a confirmation operation is further facilitated.

6. Modified Embodiments

In the above description, the chromatograph of the present invention is described as being applied to a gas chromatograph. However, the chromatograph of the present invention may also be applied to a liquid chromatograph.

Further, in the above description, it is described that, when the display screen 111 is in the compare mode, a chromatogram of a previous analysis is displayed in the second graph region 115. However, it is also possible that, in the second graph region 115, one chromatogram selected from multiple chromatograms generated during past analyses is displayed. Specifically, multiple data sets of chromatograms generated during past analyses are stored in the memory 12, and, when the display screen 111 is in the compare mode, the display processing unit 132 may display in the second graph region 115 a chromatogram based on one data set selected from the multiple data sets.

Further, in the above description, it is described that the modification of the display in the graph region is performed based on a specific touch operation with respect to the graph region. However, it is also possible that the display in the graph region is modified based on a touch operation other than the above-described specific touch operation. That is, the touch operation when the chromatogram displayed in the graph region is display in an enlarged scale or in a reduced scale, or is superimposingly displayed with another chromatogram is not limited to a long press operation, a pinch out operation, a pinch in operation, a drag operation or the like. For example, it is also possible to modify the display in the graph region based on various other touch operation such as an operation (tap) in which the same position of the display screen is continuously touched twice.

DESCRIPTION OF REFERENCE NUMERALS

4: detector
10: main body
11: display
13: controller
111: display screen
113: first graph region
115: second graph region
132: display processing unit

What is claimed is:

1. A chromatograph comprising:
a main body;
a detector that is provided in the main body and detects a sample and outputs a detection signal;
a display device that is provided in the main body and has a touch panel display screen; and
a display processing unit that, based on a detection signal from the detector, displays a chromatogram in real time in a graph region designated to display the chromatogram in real time in the display screen, and, based on a touch operation with respect to the graph region in the display screen, modifies a display in the graph region,
wherein the display processing unit, based on a detection signal from the detector, displays a chromatogram in the graph region in the display screen while allowing the chromatogram to change in real time, and, based on a touch operation with respect to the graph region in the display screen, stops the changing of the chromatogram, and, based on a touch operation with respect to the graph region thereafter, modifies the display in the graph region.

2. The chromatograph according to claim 1, wherein the display processing unit, based on a touch operation with respect to the graph region in the display screen, displays in an enlarged scale or in a reduced scale the chromatogram displayed in the graph region.

3. The chromatograph according to claim 1, wherein the display processing unit, based on a touch operation with respect to the graph region in the display screen, superimposingly displays the chromatogram displayed in the graph region and another chromatogram.

4. The chromatograph according to claim 1, wherein the display processing unit, after stopping a display of the chromatogram in the graph region in the display screen, when a touch operation with respect to the graph region has not been performed for a certain period of time, resumes the changing of the chromatogram.

* * * * *